US006604288B2

(12) United States Patent
Whited et al.

(10) Patent No.: US 6,604,288 B2
(45) Date of Patent: Aug. 12, 2003

(54) ROTARY KNIFE

(75) Inventors: Jeffrey A. Whited, Amherst, OH (US); Robert L. Leimbach, Wakeman, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 55 days.

(21) Appl. No.: 09/768,970

(22) Filed: Jan. 24, 2001

(65) Prior Publication Data

US 2002/0096027 A1 Jul. 25, 2002

(51) Int. Cl.[7] .......................... A22C 17/04; A26B 15/00
(52) U.S. Cl. .......................................... 30/276; 452/133
(58) Field of Search .................. 30/276, 347; 452/132, 452/133, 137, 149, 164

(56) References Cited

U.S. PATENT DOCUMENTS

| | | | | | |
|---|---|---|---|---|---|
| 3,269,010 | A | * | 8/1966 | Bettcher | 30/276 |
| 4,170,063 | A | * | 10/1979 | Bettcher | 30/276 |
| 4,178,683 | A | * | 12/1979 | Bettcher | 30/276 |
| 4,198,750 | A | * | 4/1980 | Bettcher | 30/276 |
| 4,236,531 | A | * | 12/1980 | McCullough | 30/276 |
| 4,363,170 | A | * | 12/1982 | McCullough | 30/276 |
| 4,516,323 | A | * | 5/1985 | Bettcher et al. | 30/276 |
| 4,575,938 | A | * | 3/1986 | McCullough | 30/276 |
| 4,854,046 | A | * | 8/1989 | Decker et al. | 30/276 |
| 5,522,142 | A | * | 6/1996 | Whited | 30/276 |
| 5,664,332 | A | * | 9/1997 | Whited et al. | 30/276 |
| 5,692,307 | A | | 12/1997 | Whited et al. | 30/276 |
| 5,761,817 | A | * | 6/1998 | Whited et al. | 30/276 |
| 5,940,972 | A | * | 8/1999 | Baris et al. | 30/276 |

* cited by examiner

*Primary Examiner*—Charles Goodman
(74) *Attorney, Agent, or Firm*—Watts, Hoffmann, Fisher & Heinke, Co., L.P.A.

(57) ABSTRACT

A rotary knife having a handle having a head section, a blade housing that comprises a split, ring-like member supported by the head section and defining a circumferentially extending groove, an annular blade supported in the blade housing groove for rotation about a central axis. The blade housing comprises a ring-like member having an annularly extending blade supporting groove that opens radially inwardly and in which the blade is rotatably disposed. The groove peripheral wall defines a plurality of blade engaging bearing faces spaced apart throughout the blade housing periphery and a plurality of circumferentially spaced apart fat receiving recesses. The blade housing also defines a plurality of fat directing channels each communicating with a fat receiving recess for directing fat from the recess out of the blade housing. Opposite sides of the split blade housing are detachably connected to the head section and one end of the split housing is movable relative to the head section by a rack and pinion gear set to enable blade removal and replacement.

9 Claims, 5 Drawing Sheets

ROTARY KNIFE

FIELD OF THE INVENTION

The present invention relates to a rotary knife and more particularly to a rotary knife having an annular blade supported in a generally circular blade housing for rotation about a central axis.

BACKGROUND OF THE INVENTION

Power operated knives having annular blades supported for rotation in a groove formed in an annular blade housing are in widespread use for cutting meat. These knives have been subject to problems resulting from fat being deposited within the grooves between the blades and the blade housings. Fat that is present in the meat is often pressed into the juncture of the rotating blade and the blade housing as the knife is used to trim meat. The fat is swept away by the rotating blade, softens, and becomes fluent when exposed to heat generated by the blade. The fluent fat is swept into the narrow space between the radially outer blade periphery and the adjacent radially outer blade groove wall, from which escape is difficult. Blade friction continues to heat the fluent fat in the blade groove eventually transforming it into a varnish-like film that interferes with knife operation by creating more friction and heat. Consequently the knives must be taken out of service so that the fat deposits may be removed.

The prior art knives have been provided with lubrication systems by which the knife operator can introduce an edible lubricant into the blade housing for the purpose of reducing friction and concomitant heating. The quantity of lubricant supplied to the knives has not been easily controlled. When excessive amounts have been introduced, the lubricant itself has become overheated, turned into a varnish-like coating and exacerbated the heating problems by increasing the blade friction.

Rotary knives that have annular blades supported by blade housings for rotation about a central axis have been constructed in the past with different schemes for enabling blade removal and replacement. In some cases, the blade housing was annular, split member that supported a continuous annular blade member in a groove that opened radially inwardly toward the blade rotation axis. The blade housing was resiliently expanded by spreading its split ends far enough apart to permit removal and replacement of the continuous annular blade. Many knives of this construction required the operator to manually grip the blade housing while spreading its ends. In other constructions the blade housings were provided with tool receiving slots so that a screw driver or similar tool could be inserted in the slot and used to pry the blade housing ends apart. These approaches tended to be unwieldy, particularly where a single operator had to hold the knife and maintain the blade housing expanded while trying to insert a blade into the blade housing. When operators did not wear prescribed cut resistant gloves, hand cuts could result.

The present invention provides a new and improved rotary knife that is so constructed and arranged that fluent fatty material accumulating between the blade and the blade housing groove is directed out of the blade housing. The invention also provides a new and improved rotary knife wherein the blade may be removed from a split blade housing and replaced without requiring the operator to separate the blade housing ends by hand or by using a hand tool.

SUMMARY OF THE INVENTION

The present invention provides a new and improved rotary knife having a blade housing and an annular blade supported by the blade housing for rotation about a central axis The blade defines a body section supported by the blade housing and a blade section that extends axially from the body section and projects from the blade housing. The blade housing comprises a ring-like member having an annularly extending blade supporting groove that opens radially inwardly and in which the blade is rotatably disposed. The groove is defined by axially spaced apart first and second walls and a peripheral wall located between the first and second walls. The peripheral wall defines a plurality of blade engaging bearing faces spaced apart throughout the blade housing periphery and a plurality of circumferentially spaced apart fat receiving recesses. The blade housing also defines a plurality of fat directing channels each communicating with a fat receiving recess for directing fat from the recess out of the blade housing.

In an illustrated embodiment one of the first and second axially spaced walls defines the fat directing channels with the channels axially aligned with the respective recesses.

According to another feature of the invention a rotary knife is provided that comprises a handle, a split blade housing that comprises a ring-like member supported by the handle and defining a circumferentially extending groove, an annular blade supported in the blade housing groove for rotation about a central axis, and a manually actuated mechanism for adjustably changing the width of the split to enable removal of the blade. The split blade housing has end portions on opposite sides of the split that are detachably connected to the handle. The mechanism comprises a first element movably supported by the handle and a second element fixed with respect to an end portion of the blade housing, the first and second elements reacting to expand and contract the split.

In an illustrated embodiment the first and second elements are gears.

Additional features of the invention will become apparent from the following detailed description made with reference to the accompanying drawings.

DESCRIPTION OF THE BEST MODE KNOWN FOR PRACTICING THE INVENTION

Figure 1:
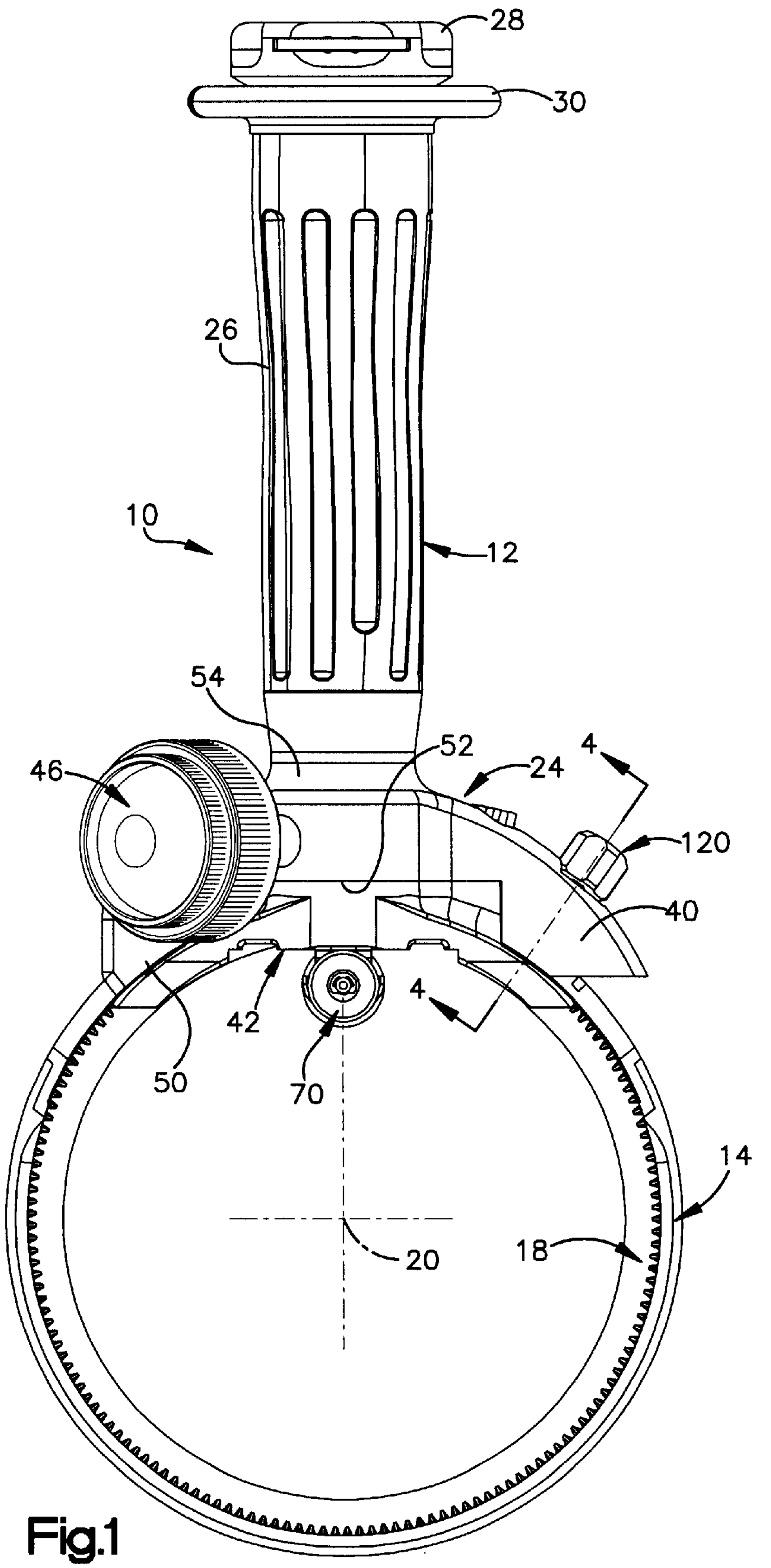
FIG. 1 is a top plan view of a rotary knife embodying the present invention.

A rotary knife 10 embodying the invention is illustrated in the drawings. As illustrated by FIG. 1 the knife 10 comprises a handle 12, a ring-like generally circular, split blade housing 14 supported by the handle, and an annular blade 18 supported by the blade housing for rotation about a central axis 20. The illustrated knife is connected to a remote electric motor by a flexible drive shaft so that the blade 18 is driven about its axis 20 from the electric motor. The motor and drive shaft may be of any suitable or conventional construction and are not illustrated. It should be appreciated that other means may be employed to drive the blade 18. For example, an air motor may be mounted in the handle and connected to a source of pressurized air via a suitable hose, or an electric motor may be mounted in the handle and connected to a power source by a power cord.

Figure 2:
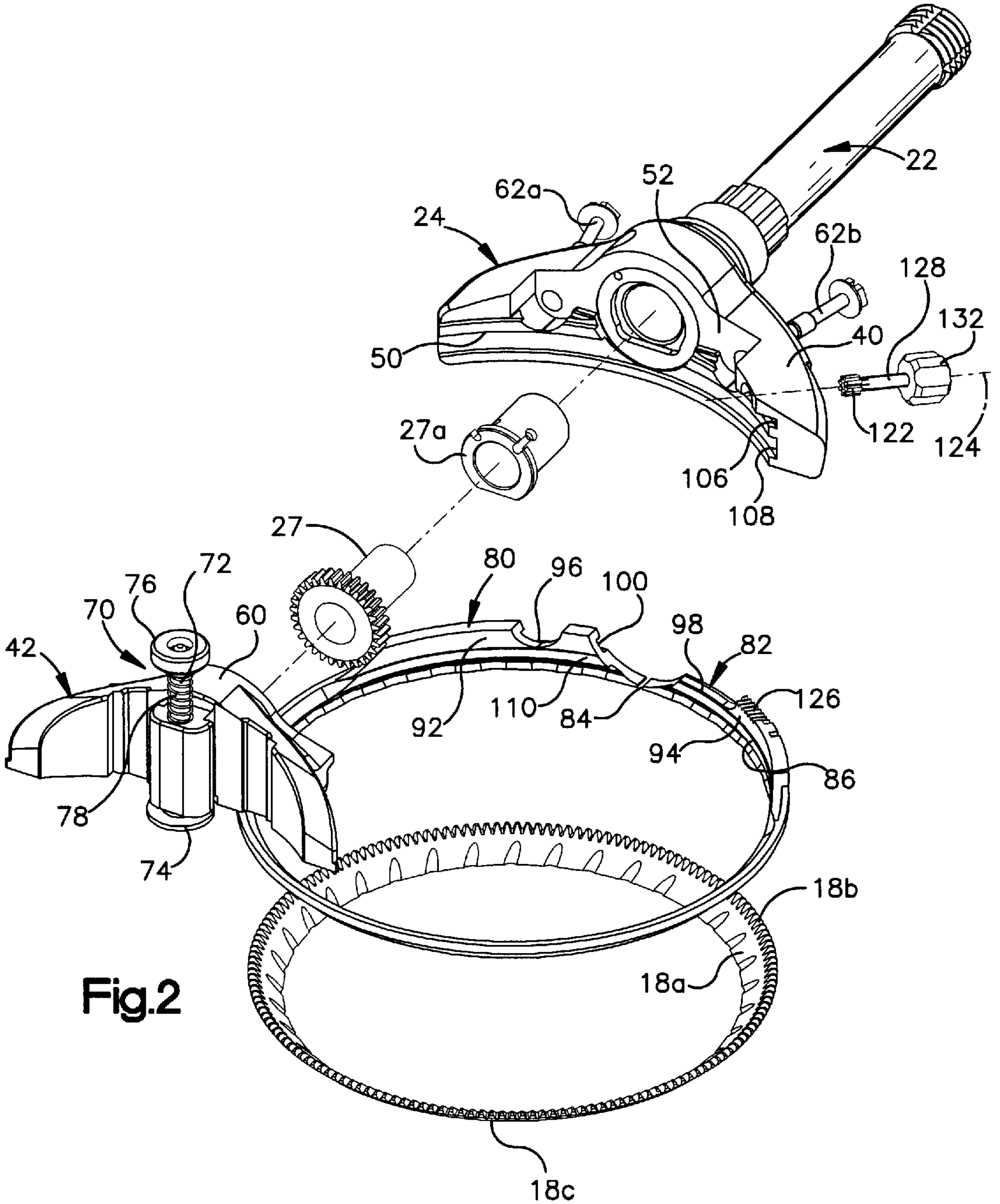
FIG. 2 is an exploded view of the knife of FIG. 1 with parts removed.
Figure 3:
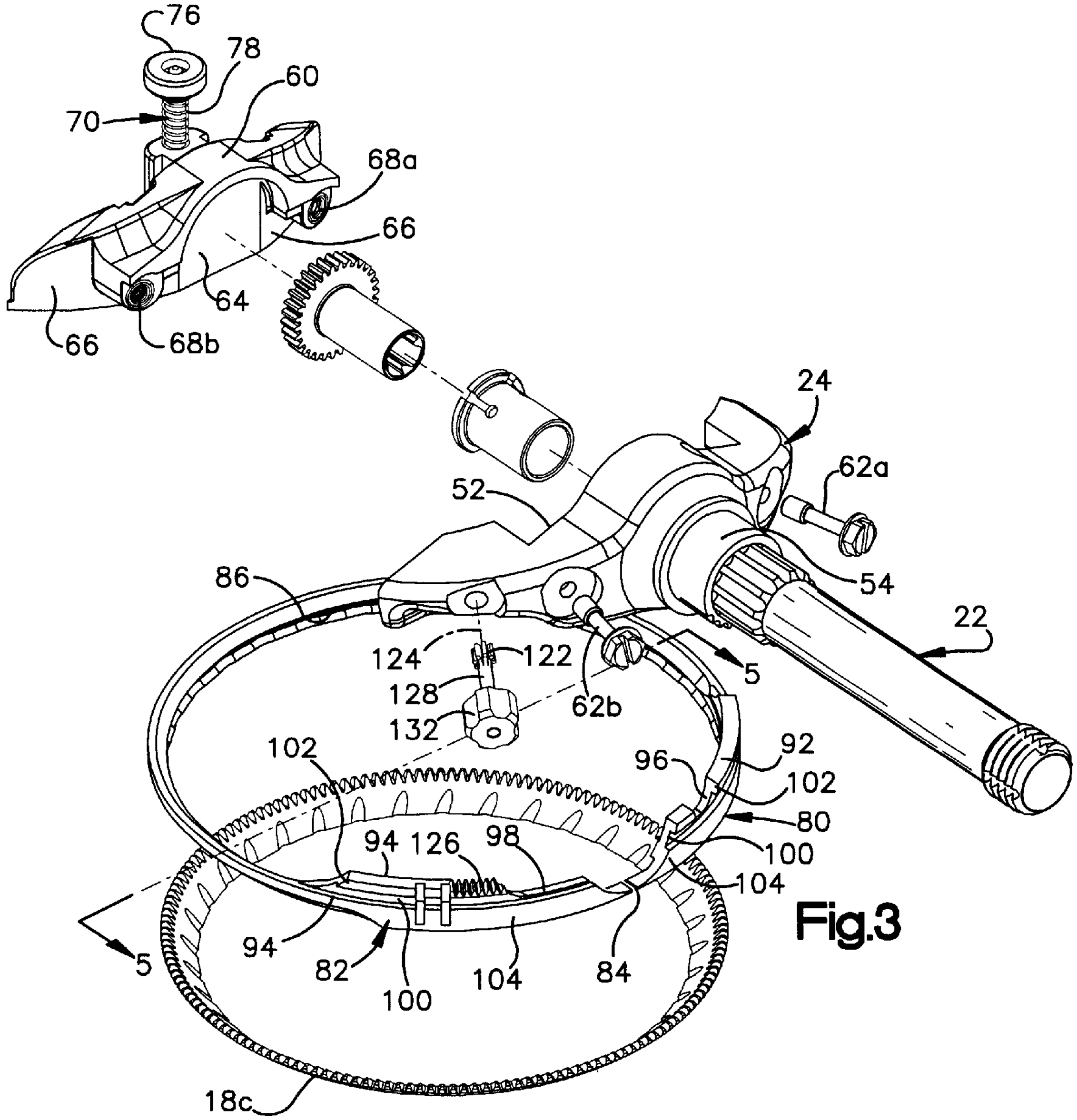
FIG. 3 is a view of the knife as illustrated in FIG. 2 seen from a different vantage point.

The illustrated handle 12 extends away from the blade and blade housing along a line that is transverse to the axis 20 allowing the knife operator to wield the knife with one hand. Referring to FIGS. 1–3, the handle 12 comprises a supporting frame member 22, a head assembly 24 fixed to the frame member, a hand piece 26 surrounding the frame member by which an operator grips the knife, and an assembly nut 28 that clamps the hand piece 26 in place on the frame member.

The frame member 22 rigidly supports the hand piece 26, the head assembly 24, a blade driving pinion gear 27, and a pinion gear supporting bearing **27*a* while providing a channel through which the flex shaft extends to make a driving connection with the pinion gear 27. The frame member is illustrated as formed by an elongated rigid tube that is fixed in the head assembly 24 and carries threads at its end distal the head assembly for receiving the assembly nut 28. The blade driving pinion gear 27 projects from the frame member and the head assembly for rotating the blade 18**.

The illustrated hand piece 26 is so constructed and arranged that it "fits" the knife operator's hand size and is easily removable from the knife, permitting the operator to take the hand piece away at the end of the operator's shift. The hand piece is formed by a plastic tube carrying an over-molded rubber-like gripping body that is shaped and sized to match the operator's hand. The end of the hand piece distal the knife blade forms a flange 30 that is engaged by the assembly nut 28 to clamp the hand piece in place on the frame member. The assembly nut 28 is unscrewed from the frame member to enable hand piece removal and replacement.

The head assembly 24 firmly secures the blade housing 14 and blade 18 to the handle 12 while enabling their removal and replacement when desired. The illustrated head assembly comprises a head member 40 and a clamp assembly 42 that detachably clamps the blade housing and blade to the head member. The illustrated head assembly also comprises a conventional lubrication system, generally indicated by the reference character 46 (FIG. 1) by which a relatively viscous, edible lubricant may be supplied to the pinion gear 27, the blade, and the blade housing via suitable passages that are not illustrated. The knife operator depresses a rubber-like diaphragm of the lubrication system to force a flow of the lubricant into the pinion gear teeth from which the lubricant flows onto the blade and is circulated about the blade housing.

The head member 40 positions the blade housing 14 relative to the handle 12 and supports the lubrication system 46. The illustrated head member is a generally crescent shaped, cast metal body that defines a semi-circular blade housing seating region 50, a clamp assembly receiving, socket-like cavity 52, and a boss 54 that surrounds the frame member 22 and projects from the head member body opposite to the cavity 52 and seating region 50. The bearing **27*a*** is a tubular member that is fixed in the head member and surrounds a shank of the pinion gear.

The clamp assembly 42 firmly maintains the blade housing 14 seated against the seating region 50 to rigidly position the blade 18 while covering the pinion gear 27, which might otherwise be directly exposed to meat, fat, bone chips, etc. The clamp assembly 42 comprises a clams body 60, and clamping screws **62*a*, 62*b*. See FIGS. 1–3. The clamp body 60 defines a semicircular recess 64 confronting the head ring-like member for receiving the pinion gear, clamping faces 66 (FIG. 3) that engage the blade housing along its inner periphery on respective opposite sides of the blade housing split, and clamping screw receiving bosses 68*a*, 68*b* that project past the blade housing into the cavity 52**.

The clamping screws 62 extend through respective holes in the rear side of the head member 40 and into respective tapped holes in the clamp body bosses 68. The screws are tightened to clamp the body 60 against the blade housing 14. Each clamp face 66 exerts force on the blade housing that depends on the tension in the respective adjacent clamping screw 62. The illustrated clamping screws 62 are unscrewed from the body to release the body 60 and the blade housing 14 from the handle 12. In the illustrated knife, the screws and the receiving holes in the head member are constructed so that the screws are captured in the receiving holes when unscrewed from the clamp body. This prevents the screws from being misplaced when changing blade housings.

The clamp assembly 42 is illustrated as including a steeling mechanism 70 by which the blade 18 can be straightened by the knife operator. The illustrated steeling mechanism 70 comprises a cylindrical plunger 72 that loosely extends through a bore in the clamp body 60 parallel to the blade axis 20, a steel member 74 fixed to one end of the plunger, a button 76 fixed to the opposite end of the plunger by which the operator can depress the plunger to engage the steel member with the blade 18, and a return spring 78 reacting between the button and the clamp body 60 for biasing the plunger in a direction away from engagement with the blade. The steeling mechanism forms no part of the invention and is therefore not described in further detail since it may be of any conventional or suitable construction and may be omitted from the knife 10 altogether if desired.

While a particular handle construction has been illustrated and described, any handle that supports the blade housing 14 and blade 18 in a way that enables a split blade housing to be detachably clamped in place may be employed. Just for example, and without limitation, the head member, hand grip and frame member could be replaced by a single cast metal member. The clamp assembly could be replaced by headed bolts and nuts that clamp the blade housing to the handle.

The blade housing 14 is an annular member that receives and rotatably supports the blade 18. The blade housing has first and second end portions 80, 82 extending circumferentially away from opposite sides of the blade housing split 84 along the handle seating region 50 and defines a radially inwardly opening circumferential groove 86 that receives the blade 18. The blade housing is split to enable its resilient expansion for removing and replacing the blade 18.

The blade housing is constructed and arranged so that the end portion 82 is shiftable along the handle seating region 50 relative to the end portion 80 for expanding the blade housing. The blade housing 14 is centered on the blade axis 20 with the end portions 80, 82 forming a blade housing mounting structure that extends circumferentially partially about the blade housing on opposite sides of the split 84 between the head member 40 and the clamp assembly 42.

The illustrated end portions 80, 82 include axial extensions 92, 94 that are clamped between the clamp body 60 and the head member 40 and are constructed for facilitating blade housing expansion for blade removal and replacement. The extension 92 defines an arcuate notch 96 through which the boss 68*a* extends. The illustrated notch closely conforms to the shape of the boss. When the clamping screw 62*a* is threaded into the boss, the boss extends through the notch 96. When the screw 62*a* is loosened, but still threaded into the boss 68*a,* the blade housing end portion 80 remains essentially fixed against movement along the respective clamp face 66 that it confronts because of the close fitting relationship between the boss 68*a* and the notch 96.

The illustrated extension 94 defines an elongated reduced height section 98 that extends away from the split 84. The boss 68*b* extends through the reduced height section 98 when the blade housing is supported on the head member. The length of the reduced height portion 98 assures that the blade housing end portion 82 can move freely along the confronting clamp face 66 toward and away from the end portion 80 when the clamp screw 62*b* is loosened.

In the illustrated blade housing the axial extensions 92, 94 define a radially outwardly facing, circumferentially extending groove 100 that forms axially spaced lands 102, 104 that project into conforming seating grooves 106, 108 in the head member seating region 50. The illustrated extensions 92, 94 also define a radially inwardly facing, circumferentially extending land 110 engaged by the clamping body faces 66. The land 110 is disposed axially between the lands 102, 104 so that the clamping force transmitted to the head member is distributed fairly evenly between the lands 102, 104.

The illustrated blade housing defines a semicircular cut-out area in each end portion 80, 82 with each cut-out area conforming to the pinion gear diameter. The split 84 is formed in a plane that extends through the rotation axes of the pinion gear 27 and the blade 18. This split location assures that the end portions can be separated to expand the blade housing without interference between the pinion gear and the blade housing ends.

Figure 4:
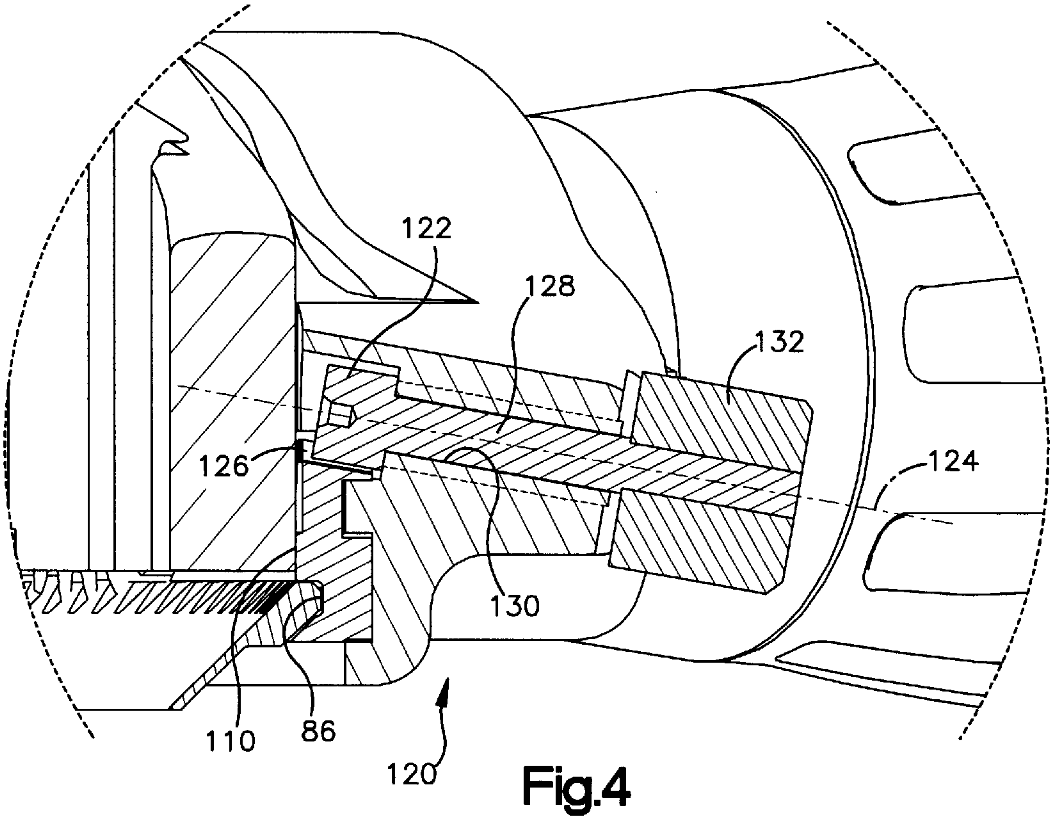
FIG. 4 is an enlarged fragmentary cross sectional view seen approximately from the plane indicated by the line 4—4 of FIG. 1.

A manually operated mechanism 120 shifts one of the end portions circumferentially toward and away from the other end portion relative to the handle 12 for enabling removal and replacement of the blade 18. The mechanism 120 is shown in FIG. 4 as comprising a first gear member 122 supported by the handle for rotation about an axis 124 extending through the head assembly, and a second gear 126 fixed with respect to the shiftable blade housing end portion.

In the illustrated knife the gear member 122 is a pinion gear that is fixed to a pin-like shaft 128 extending through a bore 130 in the head member. The pinion gear 122 is rotatably disposed in a semi-cylindrical recess in the head member. The opposite end of the shaft 128 supports an operating knob 132 by which the knife operator turns the shaft 128 and the pinion gear. The illustrated knob 132 is a ribbed cylindrical member that has a slightly larger diameter than the pinion gear 122 and is configured so that the operator may easily turn the knob using a thumb and finger.

The gear 126 is illustrated as formed by rack teeth that are cut in the end portion 82 along the axial extension 94. The rack gear teeth are meshed with the pinion gear teeth whenever the blade housing is mounted on the head member. When the pinion gear 122 turns in one direction the blade housing is expanded and when the pinion gear turns in the opposite direction the blade housing contracts. When the clamping screws 62 are tightened, the frictional forces between the head member and the blade housing lock the end portion 82 in place, preventing the pinion gear from being turned. When the clamping screw 62*b* is loosened somewhat—so that the frictional force resisting movement of the end portion relative to the head member is diminished—the pinion gear 122 can be turned by the operator to shift the end portion 82 relative to the head member.

The blade housing is in a relaxed condition when the end portions are immediately adjacent each other and the split 84 is minimized. The blade housing resiliently resists expansion and is biased by internal forces to return to its relaxed condition. In the illustrated knife, the static frictional forces that resist relative motion of the gears 122, 126 are greater than the resilient blade housing forces—even when the blade housing is maximally expanded—so that the blade housing remains in its expanded condition so long as the pinion gear is not turned by the operator. This facilitates blade replacement by assuring that the operator has a free hand for replacing the blade. In the event the internal blade housing forces created by expansion were great enough to drive the gears 122, 126 and return the blade housing to its fully contracted condition, the clamping screw 62*b* could be tightened to increase the frictional forces between the blade housing and the head member.

The illustrated pinion gear 122 is a spur gear while the rack has straight teeth. But the gearing could be of any suitable or conventional construction. For example, the pinion gear could be a bevel gear, or a worm gear, with the gear component formed on the blade housing correspondingly.

In practice, when the blade is replaced, the clamping screw 62*b* is unscrewed slightly so that the adjacent clamp face 66 exerts diminished clamping force on the blade housing end portion 82. The operator actuates the gearing to expand the blade housing and replace the blade. Meanwhile, the blade housing end portion 80 remains firmly clamped in place relative to the head member 40. When the blade is replaced, the gearing is operated to return the blade housing to its contracted condition, the screw 62*b* is tightened, and the knife is ready to resume operation.

The blade 18 may be of any suitable or conventional construction and is illustrated as including an annular, inwardly convergent frustoconical blade section 18*a* projecting from the blade housing 14 and an annular enlarged body section defining a ring gear 18*b.* The gear 18*b* has axially extending teeth by which the blade 18 is driven about the axis 20 in mesh with the blade driving pinion gear 27. The outer periphery of the blade 18 is illustrated as formed by the radially outer faces on the teeth of the ring gear 18*b* which define a castellated, cylindrical outer blade wall 18*c*.

The blade housing 14 is constructed so that animal fat that would otherwise be forced into the blade housing and trapped between the housing and the blade is directed out of the blade housing. When animal fat is forced into the space between a conventional blade and blade housing, the initially fluent fat is trapped in the housing, overheats, and "cooks," creating a sticky, varnish-like protein residue that coats the confronting surfaces of the blade housing and blade and impairs efficient knife operation. When the residue cooks and builds-up, it increases the frictional forces resisting blade rotation so that the blade speed is reduced and the degree of heating experienced by the knife increases.

This overheating problem has sometimes been exacerbated—or created in the first place—by knife operators manually supplying too much lubricant to the knives. When an operator senses that a conventional knife is unduly hot and/or that the blade speed has slowed, lubricant is manually supplied. The amount of lubricant introduced to the blade is not readily determinable by the operator and sometimes excessive amounts are supplied. Where the lubricant is effective to form a thin film between the blade and blade housing, blade friction and heating are reduced. However, if excessive lubricant enters the blade housing, the lubricant itself is overheated, cooks, and forms a varnish-like residue that compounds the perceived heating or low blade speed problem.

The blade supporting groove 86 is constructed and arranged for reducing friction, and consequent heat build-up in the blade and housing, as well as for channeling animal fat out of the blade housing. The blade housing groove 86 is defined by axially spaced apart first and second walls 140, 142 and a peripheral wall 144 located between the walls 140, 142. The peripheral wall 144 defines a plurality of blade engaging bearing faces 150 spaced apart throughout the blade housing periphery and a plurality of circumferentially spaced apart fat receiving recesses 152. The bearing faces 150 confront the blade wall 18*c*. Fat directing channels 154, each communicating with a fat receiving recess 152, direct fat from the recess out of the blade housing.

The blade housing illustrated in the drawings is constructed with semi-cylindrical bearing faces 150 that are centered on the axis 20 and conform to the curvature of the blade body wall 18*c*. The illustrated bearing faces 150 have about the same circumferential extent as the recesses 152 and the recesses alternate with the bearing faces throughout the blade housing periphery. In the illustrated knife, the bearing faces have an arc length of about two (2) cm. The illustrated recesses 152 are arcuately curved and have a depth of about two or three mm. When the blade housing 14 is properly adjusted relative to the blade 18, a slight running clearance exists between the blade and the bearing faces 150.

Figure 5:
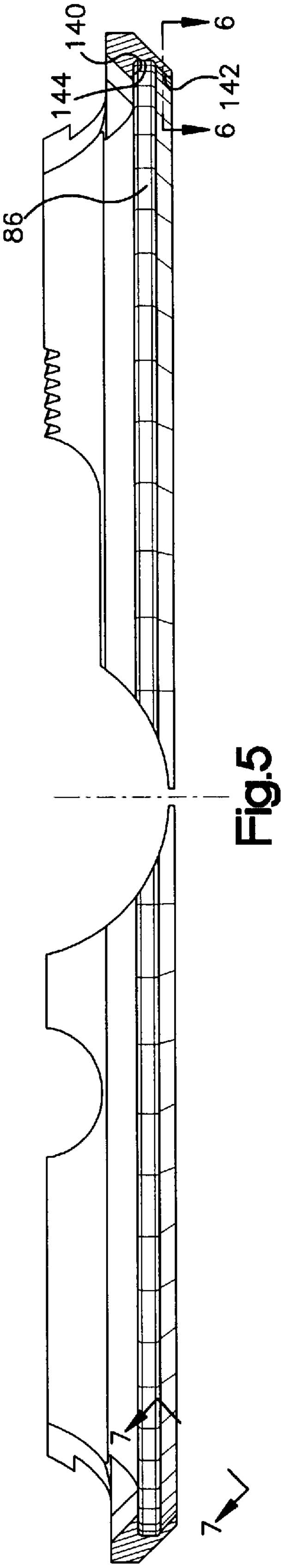
FIG. 5 is a cross sectional view seen approximately from the plane indicated by the line 5—5 of FIG. 3.
Figure 6:
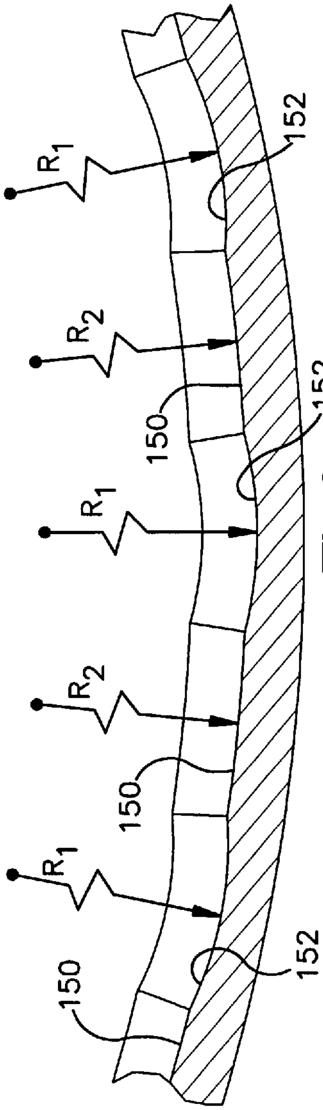
FIG. 6 is a cross sectional view seen approximately from the plane indicated by the line 6—6 of FIG. 5; and, FIG. 7 is a cross sectional view seen approximately from the plane indicated by the line 7—7 of FIG. 5.
Figure 7:
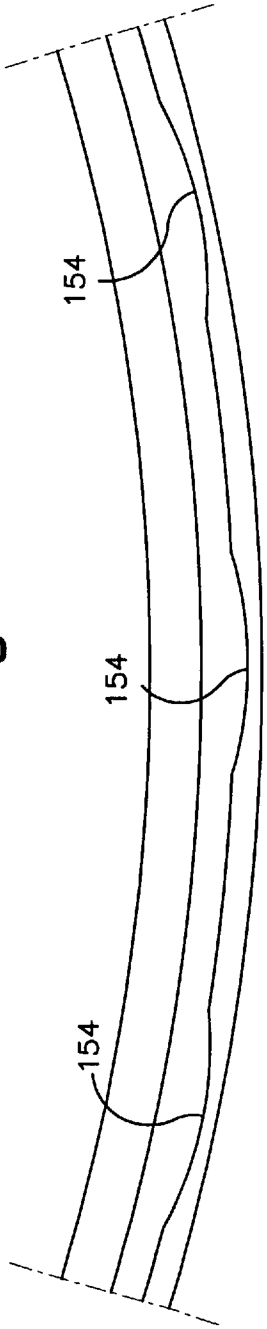

In the illustrated knife 10, the fat directing channels 154 are formed in one of the walls 140, 142. FIGS. 5–7 show the channels formed in the wall 142 and opening into the recesses 152 at the juncture of the walls 142, 144. The illustrated knife 10 is constructed with one channel for each recess 152. The channels are shallow and arcuately curved. The illustrated blade groove 86 is constructed with the wall 140 disposed in a plane that is normal to the axis 20, while the wall 142 is frustoconical and coextends with the radially outwardly facing surface of the blade section 18*a*.

The operator uses the knife 10 by holding it in one hand and moving the blade in a sweeping motion along a piece of meat being processed. A relatively localized arc of the blade and blade housing engage the meat being cut—the cutting arc being centered in the vicinity of the blade housing periphery that is located about 180° around the axis 20 from the drive pinion 27 or centered at a peripheral portion the blade located 90° from the pinion 27. The extent of the cutting arc is determined by the depth of the cut. As the blade and blade housing pass through the meat, the portion that is trimmed off by the blade passes through the blade annulus while the outer periphery of the blade and blade housing move along the surface of the meat from which the trimmed portion has been removed. Because the blade section 18*a* is frustoconical and converges proceeding away from the blade housing, the resultant force of the meat surface on the blade tends to push the blade diametrically away from the blade housing at the location where the meat is being cut. The blade and blade housing thus tend to be separated slightly more along the cutting arc than elsewhere around the blade and some fat from the meat surface is extruded into the space between the blade housing wall 142 and the blade section 18*a*.

The fat that is extruded between the blade and housing is carried along with the blade and urged toward the outer blade periphery by centrifugal force. The blade and blade housing are heated as a result of friction between them and the fat is likewise heated so that it becomes somewhat fluent. The blade carries the fluent fat around the blade periphery until the fat is deposited in one of the recesses 152. Typically the fat is deposited in recesses 152 that are spaced circumferentially from the cutting arc. As cutting continues, the blade 18 continues to sweep additional fat into the recesses in a pumping action that creates a positive pressure. Each channel 154 that is spaced from the cutting arc is open to the atmosphere. Fat from a recess 152 communicating such a channel flows through the channel and out of the blade housing 24.

The fat that enters the blade groove 86 is carried from the cutting arc and eventually channeled from the blade housing rather than being trapped in the groove. Accordingly, fat is not resident in the groove long enough to overheat and "cook" or otherwise create a residue that adheres to relatively moving parts and increases friction.

The new construction also optimizes the use and application of operator supplied lubricant. When excessive lubricant is introduced into the space between the blade and blade housing the lubricant is swept along the groove 86 by the blade and "pumped" from recess to recess so that only a thin film of the lubricant is deposited on the bearing faces 150 between the grooves 152. The lubricant oversupply is channeled from the groove and is not resident in the groove long enough to overheat and create increased blade heating.

While a single embodiment of the invention has been illustrated and described herein in considerable detail, the invention is not to be considered limited to the precise construction disclosed. Various adaptations, modifications and uses of the invention may occur to those skilled in the art to which the invention relates. It is the intention to cover hereby all such adaptations, modifications and uses of the invention that fall within the spirit or scope of the appended claims.

What is claimed is:

1. In a rotary meat cutting knife:

a blade housing; and, an annular blade supported by the blade housing for rotation about a central axis, the blade defining a body section supported by the blade housing and a blade section that extends axially from the body section and projects from the blade housing;

the blade housing comprising a ring-like member having an annularly extending blade supporting groove that opens radially inwardly and in which the blade is rotatably disposed, the groove defined by axially spaced apart first and second walls and a peripheral wall located between the first and second walls, the peripheral wall defining a plurality of blade engaging bearing faces spaced apart throughout the blade housing periphery and a plurality of circumferentially spaced apart fat receiving recesses, and a plurality of fat directing channels each communicating with a fat receiving recess for directing fat from the recess out of the blade housing.

2. The knife claimed in claim 1 wherein one of the first and second axially spaced walls defines said fat directing channels with said channels axially aligned with said respective recesses.

3. The knife claimed in claim 1 further comprising a handle, said ring-like member being split, with ring-like member end portions on opposite sides of the split detachably connected to the handle.

4. The knife claimed in claim 3 further comprising a manually actuated mechanism for adjustably changing the extent of said split to enable removal of said blade from said blade housing groove, said mechanism comprising a first element movably supported by said handle and a second element fixed with respect to an end portion of said blade housing, said first and second elements reacting to expand and contract said split.

5. The knife claimed in claim 4 wherein said first element comprises a rotatable gear and said second element comprises a rack formed on said blade housing in mesh with said gear.

6. The knife claimed in claim 5 further comprising a manually operated wheel for rotating said gear.

7. The knife claimed in claim 6 wherein said gear is a pinion.

8. The knife claimed in claim 4 wherein said handle comprises a bearing surface extending along a radially outer side of said blade housing, and a clamp having a clamping members extending along a radially inner periphery of said blade housing and bridging said end portions, said clamping member urging said end portions into engagement with said bearing surface.

9. The knife claimed in claim 8 wherein said clamp further comprises first and second screws extending between said bearing surface and said clamping member on respective opposite sides of said split, said screws individually operable to alter clamping pressure on a respective side of the split so that one blade housing member end portion is movable while the other blade member end portion remains fixed with respect to the handle.

* * * * *